United States Patent
Descheemaeker et al.

(10) Patent No.: US 10,326,985 B2
(45) Date of Patent: Jun. 18, 2019

(54) DISPLAY SYSTEM AND METHOD FOR AN AIRCRAFT

(71) Applicant: Airbus Operations SAS, Toulouse (FR)

(72) Inventors: Cedric Descheemaeker, Beauzelle (FR); Javier Manjon Sanchez, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 15/832,963

(22) Filed: Dec. 6, 2017

(65) Prior Publication Data
US 2018/0167608 A1 Jun. 14, 2018

(30) Foreign Application Priority Data
Dec. 12, 2016 (FR) .................................... 16 62280

(51) Int. Cl.
*G02B 27/01* (2006.01)
*H04N 13/373* (2018.01)
(Continued)

(52) U.S. Cl.
CPC ........... *H04N 13/373* (2018.05); *B64D 45/00* (2013.01); *G02B 27/017* (2013.01); *G02B 27/0172* (2013.01); *G06F 3/011* (2013.01); *G06F 3/012* (2013.01); *H04N 13/344* (2018.05); *G02B 27/0093* (2013.01); *G02B 2027/014* (2013.01); *G02B 2027/0134* (2013.01); *G02B 2027/0136* (2013.01); *G02B 2027/0141* (2013.01); *G02B 2027/0174* (2013.01); *G02B 2027/0185* (2013.01); *G02B 2027/0187* (2013.01); *H04N 2213/002* (2013.01)

(58) Field of Classification Search
CPC .... H04N 13/373; H04N 13/344; B64D 45/00; G02B 27/017; G02B 27/0172; G06F 3/011; G06F 3/012
USPC ......................................................... 348/117
See application file for complete search history.

(56) References Cited

U.S. PATENT DOCUMENTS

2012/0320100 A1  12/2012  Machida et al.
2015/0226969 A1   8/2015  Tsukahara et al.
(Continued)

FOREIGN PATENT DOCUMENTS

EP          3018523          5/2016

OTHER PUBLICATIONS

EP3018523 Machine Translation.*
French Search Report, Aug. 23, 2017, priority document.

*Primary Examiner* — Nguyen T Truong
(74) *Attorney, Agent, or Firm* — Greer, Burns & Crain, Ltd.

(57) ABSTRACT

A display system for a cockpit of an aircraft comprises a display device configured to be secured to a user's head in the cockpit of the aircraft. A display computer is configured to control the display of information on the display device. The display computer is configured to determine a distance between the head of the user and an element of the cockpit intersecting with a direction corresponding to a current orientation of the head of the user, when the user looks inside the cockpit, and to control a virtual display distance of the display device, corresponding to the distance between the head of the user and the element of the cockpit.

7 Claims, 7 Drawing Sheets

(51) Int. Cl.
*B64D 45/00* (2006.01)
*G06F 3/01* (2006.01)
*H04N 13/344* (2018.01)
*G02B 27/00* (2006.01)

(56) References Cited

U.S. PATENT DOCUMENTS

2016/0103326 A1  4/2016  Kimura et al.
2016/0131914 A1  5/2016  Lux et al.

* cited by examiner

DISPLAY SYSTEM AND METHOD FOR AN AIRCRAFT

CROSS-REFERENCES TO RELATED APPLICATIONS

This application claims the benefit of French patent application No. 1662280 filed on Dec. 12, 2016, the entire disclosures of which are incorporated herein by way of reference.

BACKGROUND OF THE INVENTION

The invention relates to the display of piloting assistance information in the cockpit of an aircraft. Modern aircraft, in particular transport aircraft, generally include a system for displaying piloting assistance information in their cockpit. A system of this kind, for example of CDS (control and display system) type, controls the display of information on screens, termed head-down screens, in the cockpit: to view this information, the user, generally a pilot or copilot of the aircraft, must lower his or her head to look at the screens. They are therefore not able to see at the same time the surroundings of the aircraft through a windscreen of the cockpit. In order to allow the user to see an information display without having to lower his or her head to look at the screens, some aircraft are now provided with a display device configured to be secured to the head of the user. A device of this kind is commonly termed an HMD (head-mounted display). It is sometimes also termed an HWD (head-worn display). It generally includes a display securely mounted on goggles or on a helmet so that the user can see information displayed on the display when wearing the goggles or the helmet. In the remainder of the description, the term HMD refers equally to an HMD device and an HWD device. HMD devices including a helmet are used in military aircraft to assist in operations of firing on a target, for example. HMD devices including goggles are used for displaying piloting information, for example. The display is preferably transparent so that the user can view the information displayed in augmented reality superimposed on the environment. As illustrated in FIG. 4a, the information displayed on the HMD device 20, which is secured to the head 50 of the user, is generally displayed with a collimation distance corresponding to infinity. In practice, a collimation distance that is greater than a value of the order of 4 to 6 meters can be likened to an infinite collimation distance. The HMD device 20 is arranged to display the information such that it is perceived by the user as being displayed on a virtual surface 100 located at the collimation distance. Using a collimation distance corresponding to infinity allows the user to see this information clearly when he or she looks outside the aircraft, in particular through a windscreen 40 of the cockpit. However, as illustrated by FIG. 4b, when the direction 52 in which the user looks corresponds to an element 42 of an interior portion of the cockpit 3, which element is located at a distance D from the head 50 of the user, the user must strain to accommodate his or her eyes depending on whether he or she wants to look at this element 42 of the interior portion of the cockpit or the information displayed on the HMD device. In the present description, a distance with respect to the head of the user more specifically refers to a distance with respect to the eyes of the user. In particular, this distance may be defined with respect to a point that is equidistant from both eyes, located on a straight line passing through both eyes. Moreover, it is difficult for the user to clearly see both the element 42 of the interior portion of the cockpit and the information displayed by the HMD device.

SUMMARY OF THE INVENTION

A particular aim of the present invention is to provide a solution to these problems. The invention relates to a display system for a cockpit of an aircraft, comprising:
 a display device configured to be secured to the head of a user in the cockpit of the aircraft;
 a display computer configured to control the display of information on the display device.

The system is noteworthy in that the display computer is configured:
 to determine a distance between the head of the user and an element of the cockpit intersecting with a direction corresponding to a current orientation of the head of the user, when the user looks inside the cockpit;
 to control a virtual display distance of the display device, corresponding to the distance between the head of the user and the element of the cockpit.

Thus, the display system adapts the virtual display distance of the display device to the current orientation of the head of the user. The term "virtual display distance" refers to a display distance perceived by the user. When the user looks at an element of the cockpit in an interior portion of the cockpit, the virtual display distance of the display device corresponds to the distance between the head of the user and the element of the cockpit. This allows the user to clearly see both the element of the cockpit and the information displayed on the display device, without having to strain to accommodate his or her eyes.

In a first embodiment, the display system additionally includes at least one sensor for the orientation and the position of the head of the user and a database comprising information on the interior geometry of the cockpit, and the display computer is additionally configured:
 to acquire information on the orientation and information on the position of the head of the user, provided by the at least one sensor;
 to acquire, from the database, information on the geometry of the cockpit;
 to determine the distance between the head of the user and the element of the cockpit according to the information on the orientation and the information on the position of the head of the user and information on the geometry of the cockpit.

Advantageously, the display computer is then configured:
 to determine the direction corresponding to the current orientation of the head of the user according to the information on the orientation and the information on the position of the head of the user;
 to determine a surface of the element of the cockpit on the basis of information on the geometry of the cockpit;
 to determine a point of intersection between the surface of the element of the cockpit and the direction corresponding to the current orientation of the head of the user;
 to determine the distance between the head of the user and the element of the cockpit as corresponding to a calculated distance between the head of the user and the point of intersection.

In a second embodiment, the display system additionally includes a distance measurement device associated with the display device and the display computer is configured to acquire, from the distance measurement device, the distance between the head of the user and the element of the cockpit.

In one advantageous embodiment, the display computer is additionally configured to control a virtual display distance of the display device so that it corresponds to infinity when the direction corresponding to the current orientation of the head of the user intersects with a windscreen of the cockpit of the aircraft.

According to a first alternative, the display device includes an optical device that can be controlled so as to modify the collimation distance of the display device. The collimation distance is controlled so as to correspond to the virtual display distance.

According to a second alternative, the display device is a binocular display device arranged to display a first image corresponding to the right eye of the user and a second image corresponding to the left eye of the user and the display calculator is configured to produce the first image and the second image such that the information displayed on the display device is perceived by the user as being displayed at the virtual display distance.

According to a third alternative, the display device includes a holographic display and the display computer is configured:
 to produce a holographic image in which the information to be displayed is positioned at the virtual display distance with respect to the head of the user when the image is displayed by the holographic display;
 to control the display of the holographic image on the holographic display.

The invention also relates to a display method in a cockpit of an aircraft, the aircraft including a display system comprising:
 a display device configured to be secured to the head of a user in the cockpit of the aircraft;
 a display computer configured to control the display of information on the display device.

The method is noteworthy in that it includes the following steps implemented by the display computer:
 determining a distance between the head of the user and an element of the cockpit intersecting with a direction corresponding to a current orientation of the head of the user, when the user looks inside the cockpit;
 controlling a virtual display distance of the display device, corresponding to the distance between the head of the user and the element of the cockpit.

The invention also relates to an aircraft comprising a display system as described above.

BRIEF DESCRIPTION OF THE DRAWINGS

The invention will be better understood on reading the description which follows and on examining the appended figures.

DETAILED DESCRIPTION OF THE PREFERRED EMBODIMENTS

Figure 1:
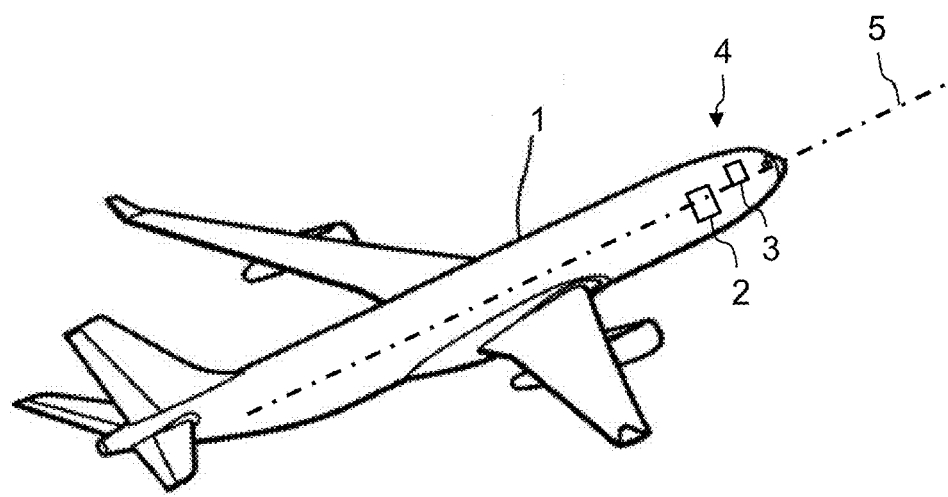
FIG. 1 illustrates, in a simplified manner, an aircraft comprising a cockpit.

The aircraft 1 shown in FIG. 1 includes a cockpit 3 in a forward portion 4 of the aircraft. It includes a longitudinal axis 5, corresponding to a roll axis of the aircraft. This longitudinal axis is substantially horizontal when the aircraft is parked on the ground. The aircraft also has a yaw axis (not shown) that is substantially vertical when the aircraft is parked on the ground. By convention, in the remainder of the description, the term horizontal refers to a straight line or a plane that is substantially horizontal when the aircraft is parked on the ground, such that this straight line or this plane is perpendicular to the yaw axis of the aircraft. Similarly, the term vertical refers to a straight line or a plane that is substantially vertical when the aircraft is parked on the ground, such that this straight line or this plane is parallel to (or contains) the yaw axis of the aircraft.

Figure 2:
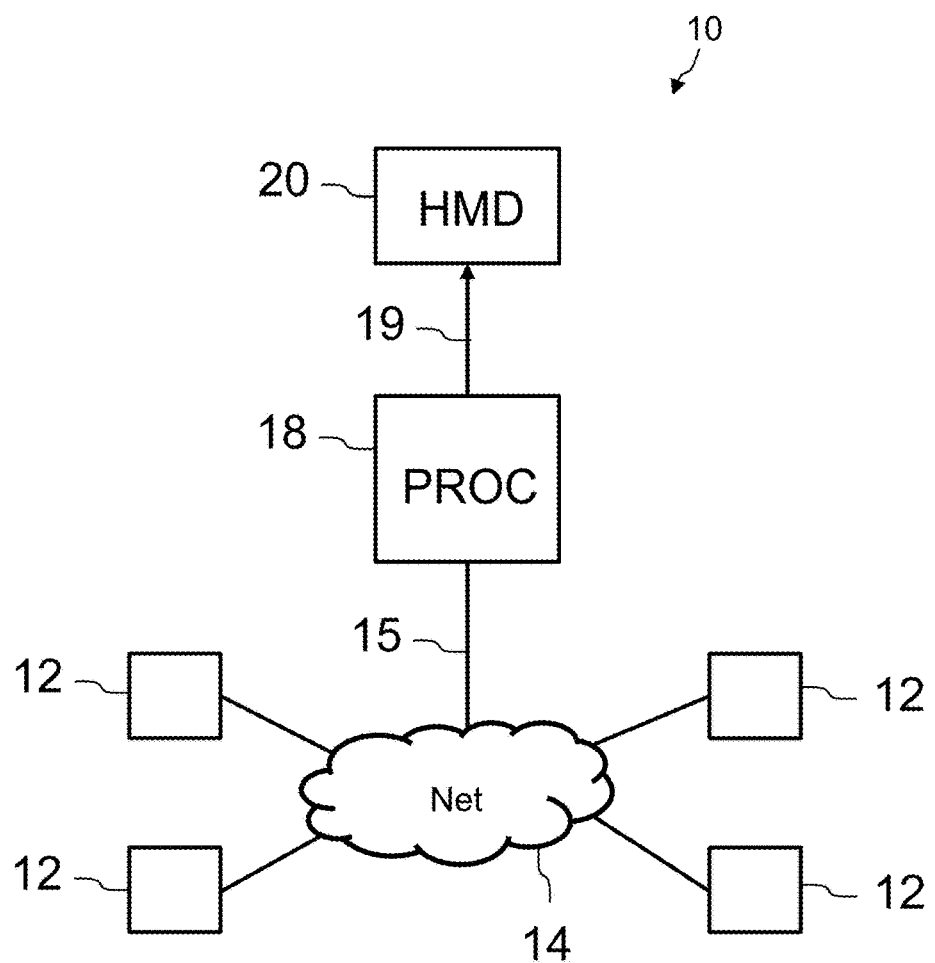
FIGS. 2, 2a and 2b schematically illustrate embodiments, in accordance with the invention, of a display system of a cockpit of an aircraft.

The display system 10 shown in FIG. 2 includes a display computer 18 comprising a processing unit (denoted by PROC in the figure). This processing unit may, in particular, correspond to a processor or a microprocessor of the display computer. According to various embodiments, the display computer 18 is either a common display computer controlling a plurality of display devices of the aircraft or a computer dedicated to the display system 10. In one particular embodiment, this computer corresponds to an IMA (integrated modular avionics) computer that also supports functions other than the display function. The display system 10 additionally includes a display device 20 configured to be secured to the head of a user in the cockpit of the aircraft. This display device corresponds to an HMD (or HWD) device as indicated above. It is linked to the display computer 18 by a link 19. The display computer 18 is linked to at least one avionics computer 12 of the aircraft. In the particular example shown in FIG. 2, the display computer is linked to a plurality of avionics computers 12 by a link 15 of a communication network 14 (denoted by "Net" in the figure) to which these avionics computers are also linked. The avionics computers 12 are, for example, located in an avionics bay 2 of the aircraft.

Figure 5:
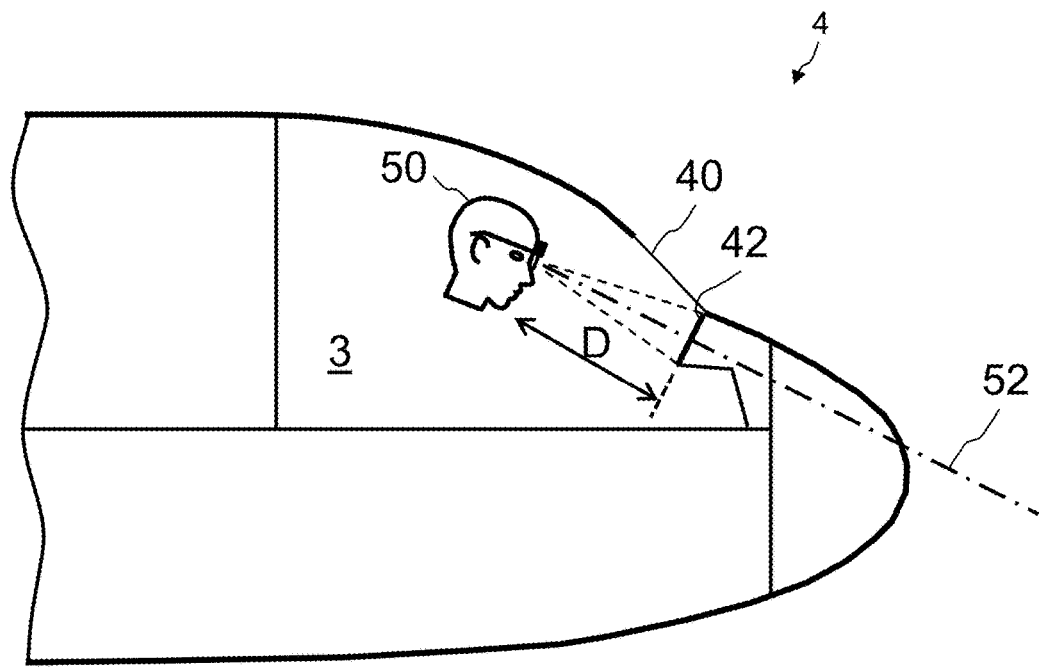
FIGS. 5 and 6 illustrate an example of display, on an HMD device, at a virtual display distance corresponding to an element of the cockpit of the aircraft.

In operation, the display computer 18 is configured to control the display of information on the display device 20. This information arises, at least partly, from the at least one avionics computer 12 or is determined by the display computer 18 according to information received from the at least one avionics computer 12. The display computer 18 is configured:
 as illustrated by FIG. 5, to determine a distance D between the head 50 of the user and an element 42 of the cockpit intersecting with a direction 52 corresponding to a current orientation of the head of the user, when the user looks inside the cockpit 3;
 to control a virtual display distance of the display device 20, corresponding to the distance D between the head 50 of the user and the element 42 of the cockpit.

Thus, when the user looks at the element 42 of the cockpit, the information is displayed by the display device 20 with a virtual display distance corresponding to the distance D. Thus, the displayed information is perceived by the user as being displayed at the distance D from his or her eyes. This is compatible with the accommodation of the eyes of the user when he or she looks at the element 42, since the distance of accommodation of his or her eyes then corresponds to the distance D. The user may thus look at the element 42 of the cockpit and see the information displayed on the display device without having to strain to accommodate his or her eyes.

Figure 2A:
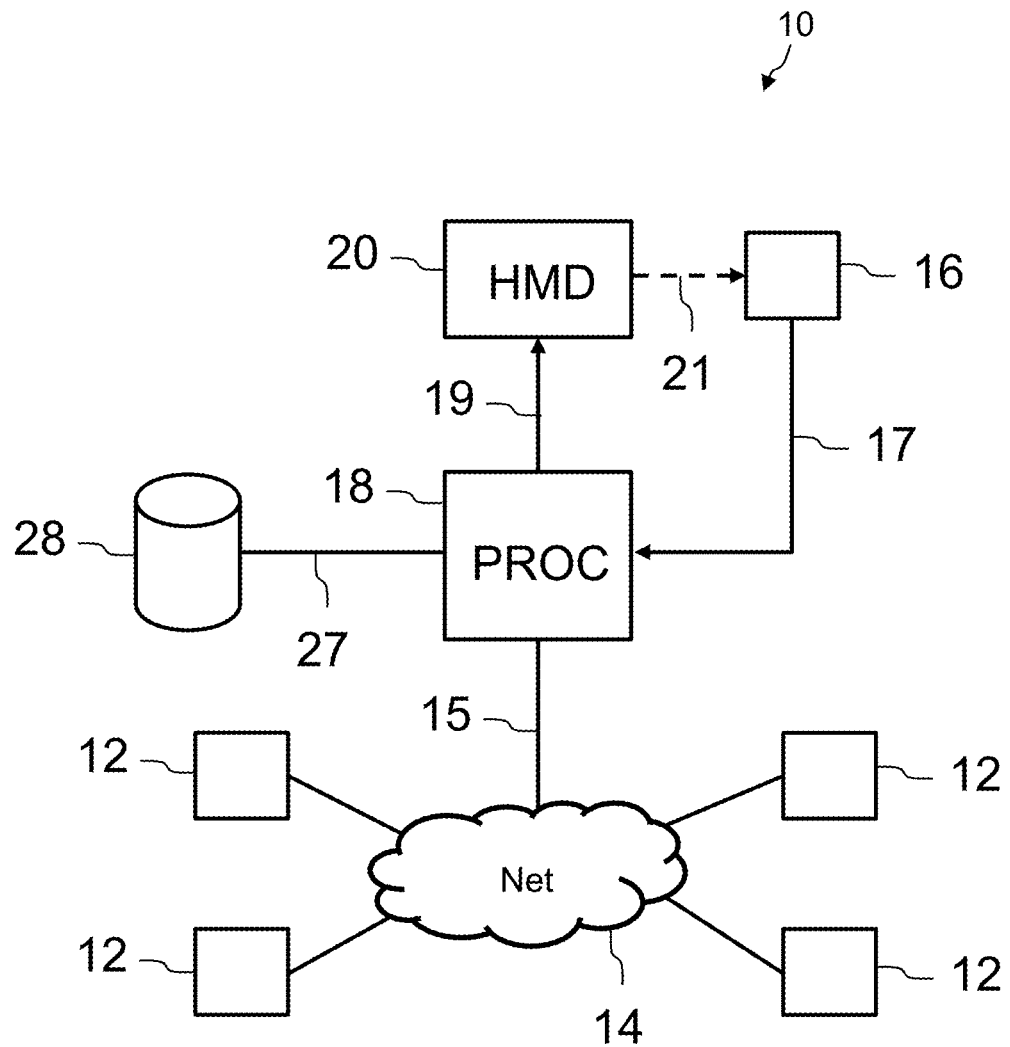

In a first embodiment illustrated by FIG. 2a, the display system 10 additionally includes a sensor 16 for the orientation and the position of the head of the user and a database 28 comprising information on the interior geometry of the cockpit. The sensor 16 for the orientation and the position of the head of the user is linked to the display computer 18 by a link 17 and the database 28 is linked to the display computer 18 by a link 27. In one particular embodiment, the sensor 16 is securely mounted on the display device 20, as shown symbolically by the dashed arrow 21. It then corresponds, for example, to a set of inertial sensors that are incorporated within the display device 20. In another particular embodiment, the sensor 16 is securely mounted on the cockpit 3 of the aircraft. It then corresponds, for example, to a camera positioned so as to automatically monitor the head of the user of the display device 20. Without departing from the scope of the invention, the sensor 16 may correspond to a group of sensors, for example a sensor for the orientation of the head of the user and a sensor for the position of the head of the user. The information on the interior geometry of the cockpit contained within the database 28 arises, for example, from a digital model of the aircraft or of the cockpit of the aircraft, in particular, from a three-dimensional digital model. Advantageously, this geometric information is simplified with respect to information from the digital model of the aircraft, so as to decrease the volume of the information as well as computing times.

In this first embodiment, the display computer is additionally configured:
- to acquire information on the orientation and information on the position of the head 50 of the user, provided by the sensor 16;
- to acquire, from the database 28, information on the geometry of the cockpit;
- to determine the distance D between the head of the user and the element 42 of the cockpit according to the information on the orientation and the information on the position of the head of the user and information on the geometry of the cockpit.

In order to achieve this, advantageously, the display computer 18 is then configured:
- to determine the direction 52 corresponding to the current orientation of the head of the user according to the information on the orientation and the information on the position of the head of the user;
- to determine a surface of the element 42 of the cockpit on the basis of information on the geometry of the cockpit;
- to determine a point of intersection between the surface of the element of the cockpit and the direction 52 corresponding to the current orientation of the head of the user;
- to determine the distance between the head of the user and the element of the cockpit as corresponding to a calculated distance between the head of the user and the point of intersection.

The determination of the point of intersection employs common geometric calculations, which are not described further since they are evident to a person skilled in the art. If required, the display computer repeats the step of determining a surface of the element 42 (on the basis of the information contained within the database 28) and the step of determining the point of intersection, for various surfaces of elements of the cockpit, until a point of intersection between a surface and the direction 52 is found.

Figure 3A:
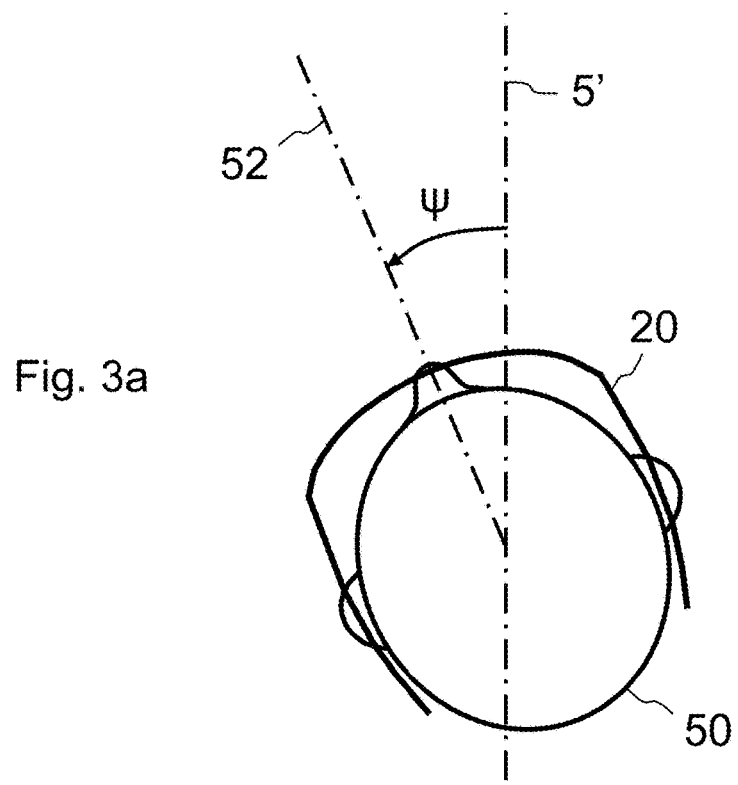
FIGS. 3a, 3b and 3c illustrate the orientation of the head of a user of the display system from above, from the side, and from behind, respectively.
Figure 3B:
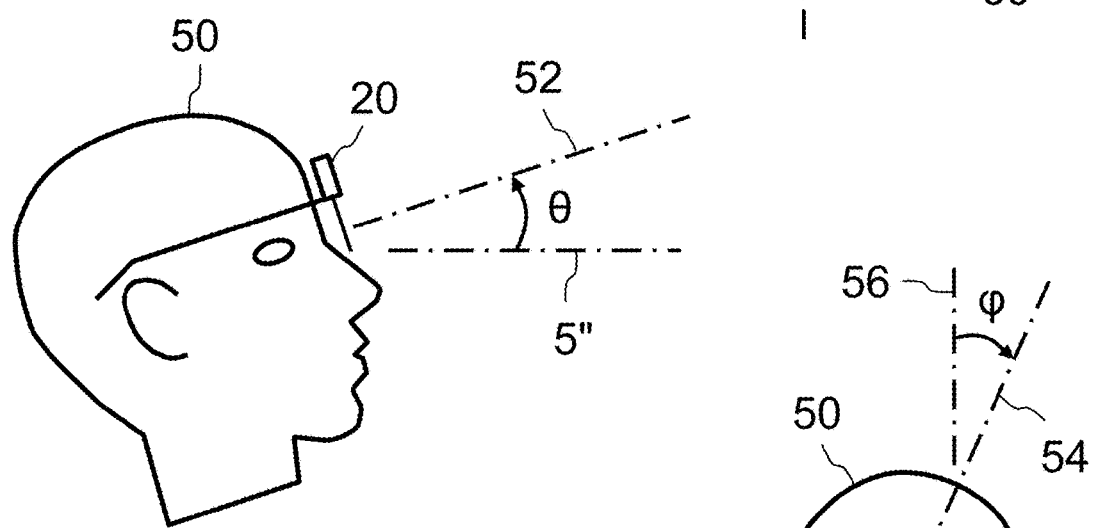
Figure 3C:
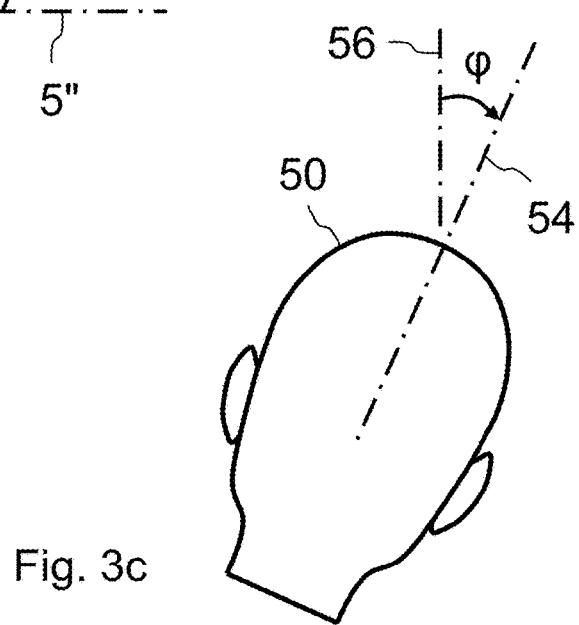
Figure 4A:
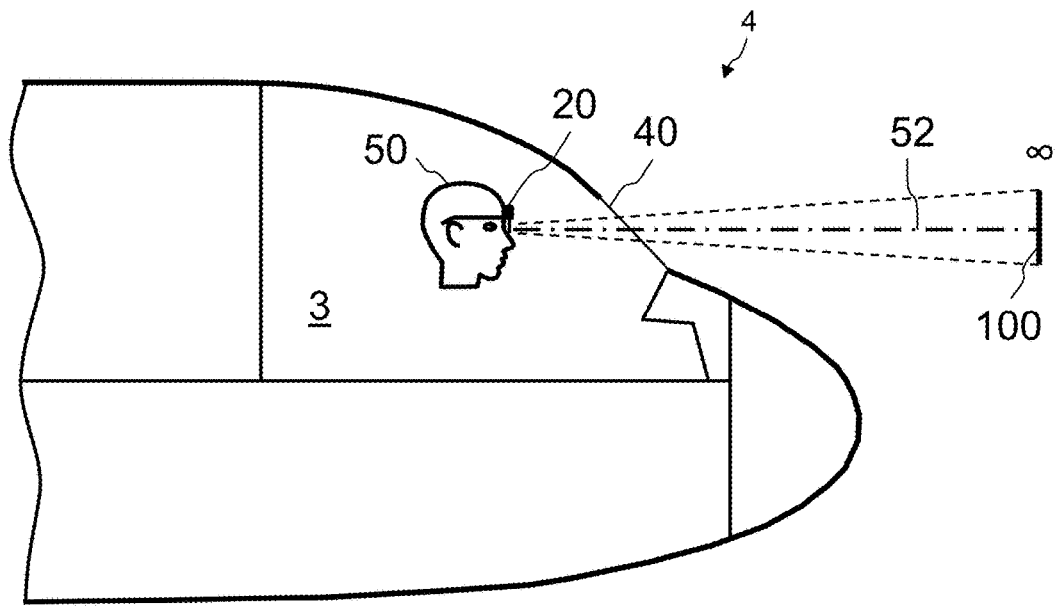
FIGS. 4a and 4b, described above, illustrate examples of display, on an HMD device, at an infinite collimation distance.
Figure 4B:
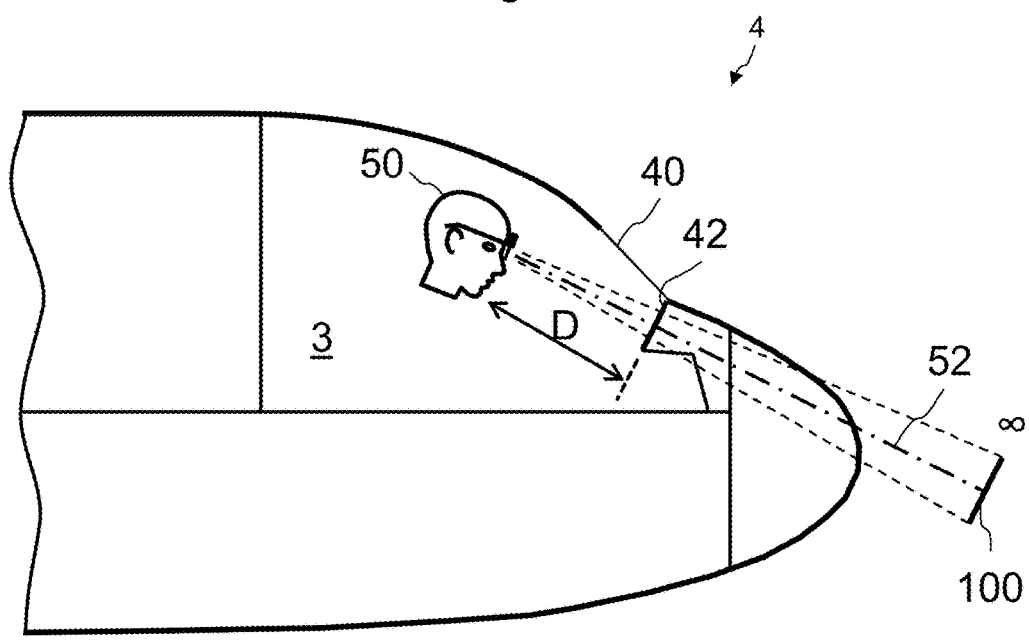

In one advantageous embodiment, the information on the orientation of the head of the user corresponds to at least one angle from a set of angles, as shown in FIGS. 3a, 3b and 3c. In these figures, the orientation of the head 50 of the user is represented by a straight line 52. In one embodiment, this straight line 52 corresponds to a theoretical direction in which the user is looking when looking to the front without turning his or her eyes either to the right or to the left and without looking up or looking down. Other definitions of the orientation of the head of the user are nevertheless possible without departing from the scope of the invention. In the advantageous embodiment, the information on the orientation of the head of the user corresponds to at least one of the following angles: a yaw angle $\psi$, a pitch angle $\theta$ and a roll angle $\varphi$, as shown in FIGS. 3a, 3b and 3c, respectively. These angles are defined in a frame of reference tied to the aircraft. Thus, the yaw angle $\psi$ is an angle defined in projection in a horizontal plane between a straight line 5' that is parallel to the longitudinal axis 5 of the aircraft and the straight line 52 representing the orientation of the head of the user. The pitch angle $\theta$ is an angle defined in projection in a vertical plane that is parallel to the longitudinal axis 5 of the aircraft, between a straight line 5" that is parallel to the longitudinal axis 5 of the aircraft and the straight line 52 representing the orientation of the head of the user. As regards the roll angle $\varphi$, it is an angle defined in projection in a vertical plane that is perpendicular to the longitudinal axis 5 of the aircraft between a vertical straight line 56 and a yaw axis 54 of the head 25 of the user. The information on the orientation of the head of the user acquired by the display computer 18 corresponds to at least one of the angles $\psi$, $\theta$ and $\varphi$.

Advantageously again, the information on the position of the head of the user corresponds to Cartesian coordinates of the center of gravity of the head 50 in an orthonormal frame of reference. In particular, a first axis of the orthonormal frame of reference is parallel to the longitudinal axis 5, a second axis of the orthonormal frame of reference is vertical and a third axis of the orthonormal frame of reference is horizontal and perpendicular to the two first axes.

Figure 2B:
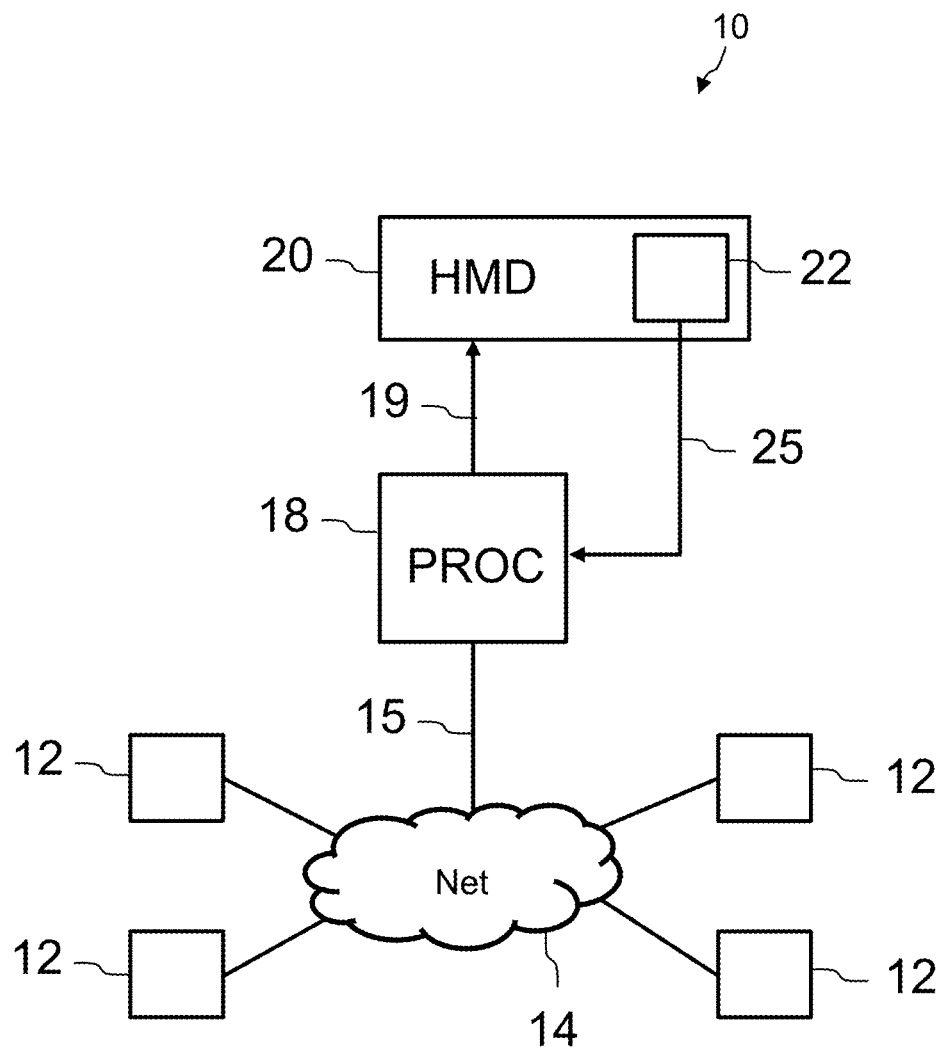
Figure 6:
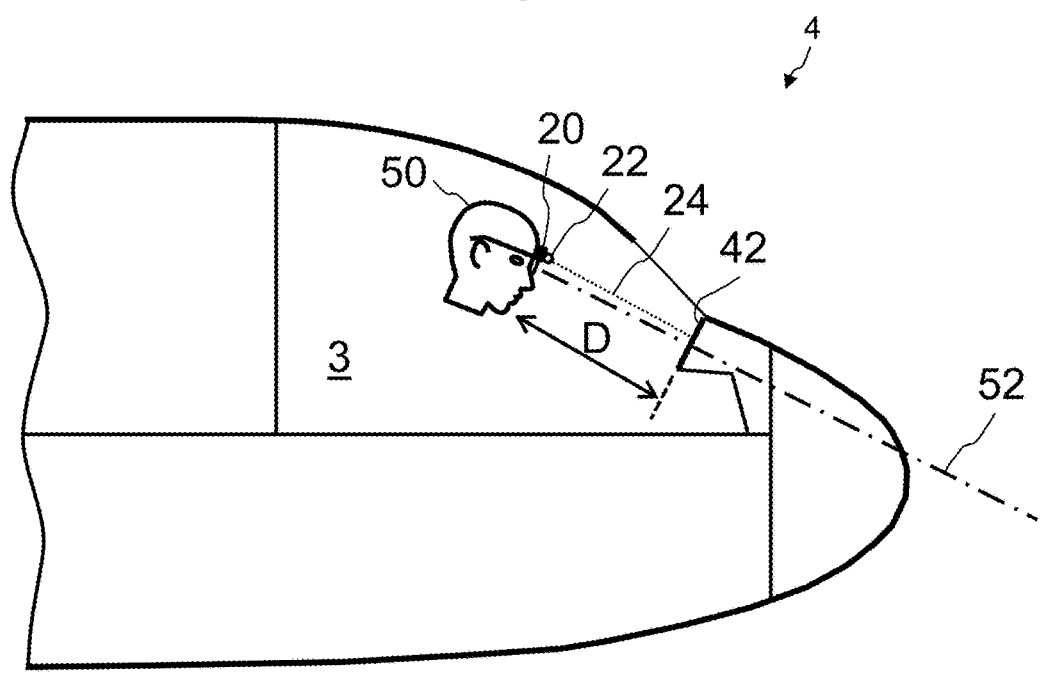

In a second embodiment illustrated by FIG. 2b, the display system 10 additionally includes a distance measurement device 22 associated with the display device 20 and the display computer 18 is configured to acquire, from the distance measurement device 22, the distance D between the head of the user and the element of the cockpit. The distance measurement device 22 corresponds, for example, to a sensor using waves such as ultrasound or electromagnetic waves, in particular, an infrared sensor. As illustrated by FIG. 6, the device 22 that is secured to the display device 20 emits a wave beam 24 in a direction corresponding substantially to the straight line 52 representing the orientation of the head of the user. As a result, the wave beam 24 is reflected by the surface of the element 42 of the cockpit and the reflected beam is received by the device 22 after a propagation time, thereby allowing the device 22 to determine the distance D. The distance D is thus determined without requiring prior knowledge of the geometry of the cockpit.

Advantageously, the display computer 18 is additionally configured to control a virtual display distance of the display device 20 so that it corresponds to infinity when the direction 52 corresponding to the current orientation of the head 50 of the user intersects with a windscreen 40 of the cockpit of the aircraft. Thus, when the user looks outside the aircraft through the windscreen 40, the information is displayed on the display device 20 with a virtual display distance corresponding to infinity. This is compatible with the accommodation of the eyes of the user when he or she looks outside the aircraft, since this accommodation then usually corresponds to an infinite collimation distance. Thus, the user may orient his or her head so as to look both inside the cockpit and outside the cockpit without having to strain to accommodate his or her eyes in order to see the information displayed on the display device.

Figure 7:
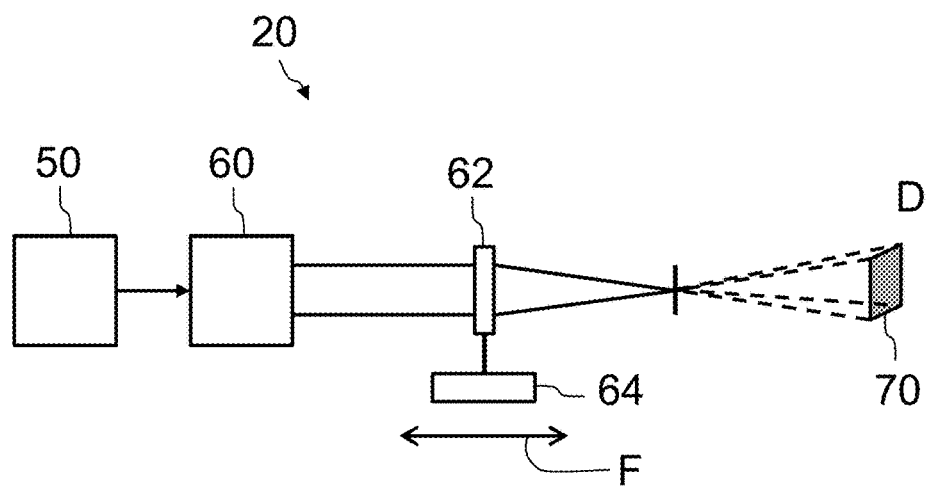
FIGS. 7, 8 and 9 illustrate several embodiments of a display device.

According to a first alternative illustrated by FIG. 7, the display device 20 includes an optical device that can be controlled so as to modify the collimation distance of the display device. More particularly, the display device 20 includes an image source 50, for example a liquid crystal display LCD. The image arising from the image source 50 is guided to an optical assembly 60 comprising, for example, optical lenses that are arranged so as to produce, as output, an optical beam that is collimated to a distance corresponding to infinity. This optical beam arrives at an optical element 62, the position of which is controllable by means of an actuator 64 in a direction that is parallel to the optical beam, as illustrated by the arrow F in the figure. The optical element 62 corresponds, for example, to an optical relay. It allows the optical beam to be focused such that the image is perceived by the user as being displayed on a virtual surface 70 located at a collimation distance D.

Figure 8:
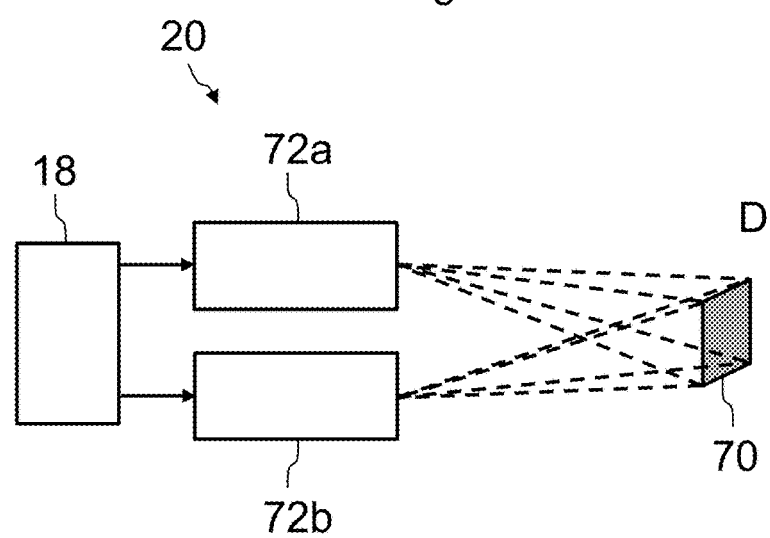

According to a second alternative illustrated by FIG. 8, the display device 20 is a binocular display device arranged to display a first image corresponding to the right eye of the user and a second image corresponding to the left eye of the user, thus allowing a three-dimensional display. The display calculator is configured to produce the first image and the second image such that the information displayed on the display device is perceived by the user as being displayed at the virtual display distance. In order to achieve this, the display device 20 includes a first display 72a and a second display 72b that are linked to outputs of the display calculator 18. For example, the first display 72a is dedicated to the left eye and the second display 72b is dedicated to the right eye. The two images that are displayed on the first display 72a and on the second display 72b, respectively, are different and such that they are perceived by the user as being a single resulting image displayed on a virtual surface 70 located at a virtual display distance D.

Figure 9:
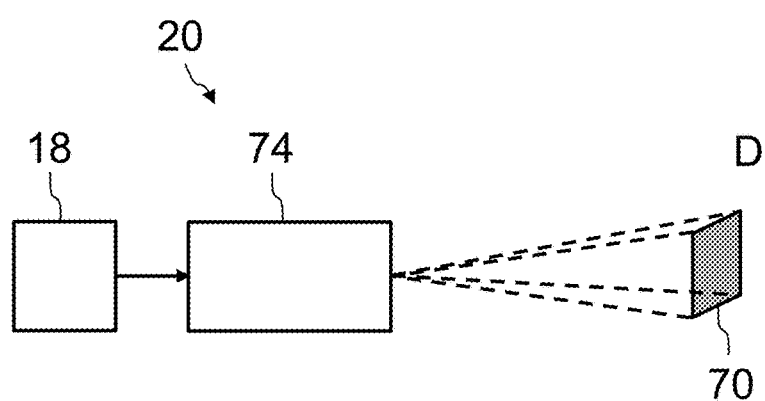

According to a third alternative illustrated by FIG. 9, the display device includes a holographic display 74 and the display computer 18 is configured:
to produce a holographic image in which the information to be displayed is positioned at the collimation distance D with respect to the head of the user when the image is displayed by the holographic display;
to control the display of the holographic image on the holographic display.

Thus, the information in the holographic image is perceived by the user as being displayed on a virtual surface 70 located at the virtual display distance D.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A display system for a cockpit of an aircraft, comprising:
a display device configured to be secured to a user's head in the cockpit of the aircraft;
a display computer configured to control a display of information on the display device;
at least one sensor configured to detect an orientation and a position of the head of the user; and
a database comprising information on an interior geometry of the cockpit;
the display computer being configured:
to acquire information on the orientation and information on the position of the head of the user, provided by the at least one sensor;
to acquire, from the database, information on the geometry of the cockpit;
to determine a distance between the head of the user and an element of the cockpit intersecting with a direction corresponding to a current orientation of the head of the user, when the user looks inside the cockpit, according to the information on the orientation and the information on the position of the head of the user and information on the geometry of the cockpit;
to control a virtual display distance of the display device, corresponding to the distance between the head of the user and the element of the cockpit, the virtual display distance being defined as a display distance perceived by the user;
to control a virtual display distance of the display device so that the virtual display distance corresponds to infinity when the direction corresponding to the current orientation of the head of the user intersects with a windscreen of the cockpit of the aircraft.

2. The system according to claim 1, wherein the display computer is configured:
to determine the direction corresponding to a current orientation of the head of the user according to the information on the orientation and the information on the position of the head of the user;
to determine a surface of the element of the cockpit on the basis of information on the geometry of the cockpit;
to determine a point of intersection between the surface of the element of the cockpit and the direction corresponding to the current orientation of the head of the user;
to determine the distance between the head of the user and the element of the cockpit as corresponding to a calculated distance between the head of the user and said point of intersection.

3. The system according to claim 1, wherein the display device includes an optical device that can be controlled so as to modify a collimation distance of the display device.

4. The system according to claim 1, wherein the display device is a binocular display device arranged to display a first image corresponding to a right eye of the user and a second image corresponding to a left eye of the user and the display calculator is configured to produce the first image and the second image such that the information displayed on the display device is perceived by the user as being displayed at the virtual display distance.

5. The system according to claim 1, wherein the display device includes a holographic display and the display computer is configured:
- to produce a holographic image in which the information to be displayed is positioned at the virtual display distance with respect to the head of the user when the image is displayed by the holographic display;
- to control the display of the holographic image on the holographic display.

6. A display method in a cockpit of an aircraft, the aircraft including a display system comprising:
- a display device configured to be secured to a user's head in the cockpit of the aircraft;
- a display computer configured to control a display of information on the display device;
- at least one sensor for an orientation and a position of the head of the user; and
- a database comprising information on an interior geometry of the cockpit;

the method including the following steps implemented by the display computer:
- acquiring information on the orientation and information on the position of the head of the user, provided by the at least one sensor;
- acquiring, from the database, information on the interior geometry of the cockpit;
- determining a distance between the head of the user and an element of the cockpit intersecting with a direction corresponding to a current orientation of the head of the user, when the user looks inside the cockpit, according to the information on the orientation and the information on the position of the head of the user and information on the interior geometry of the cockpit;
- controlling a virtual display distance of the display device, corresponding to the distance between the head of the user and the element of the cockpit, the virtual display distance being defined as a display distance perceived by the user;
- controlling the virtual display distance of the display device so that the virtual display distance corresponds to infinity when the direction corresponding to the current orientation of the head of the user intersects with a windscreen of the cockpit of the aircraft.

7. An aircraft including a display system according to claim 1.

* * * * *